United States Patent [19]

Wolken

[11] Patent Number: 4,988,177
[45] Date of Patent: Jan. 29, 1991

[54] LIGHT CONCENTRATING LENS SYSTEM

[76] Inventor: Jerome J. Wolken, 5817 Elmer St., Pittsburgh, Pa. 15232

[21] Appl. No.: 938,018

[22] Filed: Dec. 4, 1986

Related U.S. Application Data

[63] Continuation-in-part of Ser. No. 518,081, Jul. 28, 1983, abandoned.

[51] Int. Cl.$^5$ .................. G02B 23/06; G02B 17/08
[52] U.S. Cl. .................. 350/501; 350/146; 350/545; 350/435; 351/159
[58] Field of Search .............. 351/159; 350/480, 478, 350/244, 249, 146, 145, 545, 501, 502, 503, 435, 443, 444

[56] References Cited

U.S. PATENT DOCUMENTS

| | | |
|---|---|---|
| 1,716,308 | 6/1929 | Foster . |
| 3,368,078 | 2/1968 | Flint et al. ............... 250/216 |
| 3,535,015 | 10/1970 | Yevick et al. ............ 350/18 |
| 3,592,525 | 7/1971 | Schulz .................... 350/146 |
| 4,114,592 | 9/1978 | Winston .................. 126/270 |
| 4,222,371 | 9/1980 | Heath ..................... 126/440 |
| 4,240,692 | 12/1980 | Winston .................. 350/96.10 |
| 4,445,766 | 5/1984 | Yamazaki ................ 354/79 |

OTHER PUBLICATIONS

Jerome J. Wolken et al., "The Eye Structure and Optical System of the Crustacean Copepod, Copilia", *The Journal of Cell Biology*, 1969, vol. 40, pp. 279–285.

*Primary Examiner*—Jon W. Henry
*Attorney, Agent, or Firm*—Arnold B. Silverman

[57] ABSTRACT

A prosthesis for visually handicapped persons provides for collection and concentration of available light to thereby assist the visually handicapped with seeing under conditions of reduced or diffuse lighting. The prosthesis has a single or pair of tubular housing members each of which contains an imaging lens in the portion remote from the user's eye and a concentrating lens in spaced relationship from the imaging lens and closer to the user's eye than the imaging lens. A prism may be provided between the imaging lens and concentrating lens. The concentrating lens may be generally pear-shaped and have an entrance pupil of greater diameter than the exit pupil. The convex entrance surface may have a radius of curvature of about 1.8 to 2.2 times the radius of curvature of the convex exit surface. The intermediate lens surface may be generally parabolic in configuration. The concentrating lens is preferably substantially symmetrical about its longitudinal axis. The portion of the concentrating lens surrounded by the generally parabolic surface preferably has an axial extent of about 45 to 55 percent of the total axial lenght of the concentrating lens. The lens system is also usable in microsurgery, and cameras as well as other uses.

2 Claims, 3 Drawing Sheets

LIGHT CONCENTRATING LENS SYSTEM

CROSS REFERENCE TO RELATED APPLICATION

This application is a continuation-in-part of U.S. Ser. No. 06/518,081, entitled "LIGHT CONCENTRATING LENS SYSTEM", filed July 28, 1983, now abandoned.

BACKGROUND OF THE INVENTION

1. Field Of The Invention

The present invention relates to an improved lens system adapted for use in conditions of low or diffuse lighting, and, more specifically, it relates to such a system which has a capability of collecting and concentrating the available light.

2. Description Of The Prior Art

Various means have been known to assist individuals who are visually impaired. For example, millions of people employ corrective lenses in the form of contact lenses or eyeglasses in order to minimize or overcome a wide variety of problems.

It has been known to employ optical devices such as telescopes based on Galilean or Kepler optics.

With respect to people who are partially sighted the problem becomes more severe. It has been known to provide various forms of eyeglasses to provide some assistance to such individuals. It has also been known to provide single or multiple magnifying lenses in various sorts of holders to enlarge the image that the partially sighted would otherwise receive.

In spite of the foregoing prior art teachings, there is lacking any means for effectively assisting the partially sighted through a means which collects and concentrates the available light to thereby provide for improved vision under conditions of low or diffuse lighting.

U.S. Pat. No. 1,716,308 discloses a condenser lens system for a microscope wherein entry through the lens lateral surface is contemplated.

U.S. Pat. No. 3,368,078 discloses a relay lens which is employed to focus radiant energy on an aplanat having a hyperhemispherical surface and a hemispherical surface. Delivery of radiant energy to a sensor is contemplated.

U.S. Pat. No. 3,535,015 discloses a lens system usable in a microscope or telescope.

U.S. Pat. No. 3,592,525 discloses an ophthalmic surgery spectacle having large and small lenses and an interposed source of illumination.

There remains a substantial need for a lens system which efficiently collects and concentrates available light for uses, such as in a prosthesis.

There is also a need for improved lens systems adapted for improved low light performance in uses such as cameras and microsurgery.

SUMMARY OF THE INVENTION

The present invention has met the above-described needs by employing a unique combination of lenses fixedly secured within one or more housing members. The tubular housing members each have an imaging lens and a concentrating lens. The concentrating lens is designed to receive light and as a result of its unique geometric configuration, index of refraction and dimensions will serve to concentrate the light thereby improving the vision of the user The invention is particularly suited to enhancing vision of a moving object under low or diffuse lighting conditions.

The invention has numerous advantageous uses including as a prosthesis for partially sighted, in microsurgery and in cameras.

It is an object of the present invention to provide apparatus in the nature of a prosthesis which will assist individuals with impaired vision in seeing under reduced light conditions such as low or diffuse light conditions.

It is a further object of the invention to provide a system which is adapted to gather light from the environment and concentrate the same.

It is another object of the present invention to provide such apparatus which is adapted for rapid scanning and to provide high resolution of the object to the user.

It is another object of the present invention to provide such apparatus which is of simple construction, economical to manufacture and easy to use.

It is a further object of the present invention to provide such apparatus which is adapted to provide increased contrast and high resolution of the image.

It is a further object of the present invention to provide such a prosthetic device for use by the visually handicapped in order to assist with viewing of moving patterns or objects under low or diffuse lighting conditions, such as in viewing television.

It is a further object of the invention to provide an efficient, low light lens system for a camera.

These and other objects of the invention will be more fully understood from the following description of the invention on reference to the illustrations appended hereto.

DESCRIPTION OF THE PREFERRED EMBODIMENTS

Referring once again to FIG. 1 there is shown an imaging lens 2 and a concentrating lens 4, both of which would be supported within a suitable housing member (not shown in this view). Lens 2 is a biconvex lens and lens 4 is an aspherical lens. The lens 2 has a focal point $I_1$ at a distance $f_1$ from the lens. Concentrating lens 4, which is preferably an aspherical parabolic lens, is spaced from the imaging lens 2 a distance S which is less than $f_1$. Lens 2 if used alone would focus an image at $I_1$.

Lens 4, however, is interposed and intercepts the partially focused image from lens 2 and condenses the same i.e. focuses the image in a smaller area thereby greatly increasing the image intensity (brightness). This is believed to be accomplished by lens 4 decreasing the image area. Lens 4 is disposed closer to the eye of the user than imaging lens 2. The eye (not shown) will generally be positioned to the right of $I_2$. Concentrating lens 4 has a focal point $I_2$.

In general, it is preferred that all of these lenses 2, 4 be made from materials selected from the group consisting of glass and/or synthetic polymeric resins. A suitable resinous material is acrylic.

Lens 2 may be of a spherical configuration and preferably has a greater transverse extent than concentrating lens 4. Lens 2 is preferably a magnifying lens in addition to being an imaging lens in order to facilitate increasing the size of the image seen by the user. In a preferred embodiment, concentrating lens 4 is of generally pear-shaped configuration with the larger transverse portion being closer to the imaging lens 2. Focal point $I_2$ is located at a distance $f_2$ from the optical center of the lens 4.

The nodal point of the combination of lenses 2, 4 has been indicated by the letter "N" and is found by drawing a line parallel to the original ray in passing through the final image. This line behaves much like a ray passing through a single lens positioned at N. The effective focal length (EFL) is the distance from N to $I_2$ and may be obtained from the equation:

$$EFL = \frac{f_1 \times f_2}{f_1 + f_2 - S}$$

where $f_1$ and $f_2$ are the focal lengths (in water) of lenses 2, 4 respectively, and S is the distance between the perpendiculars to the optical axes through the centers of lenses 2, 4. It is the separation distance between the centers of lenses 2, 4.

Figure 2:
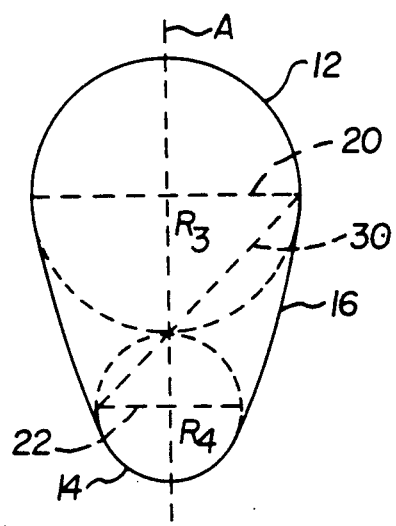
FIG. 2 is a schematic illustration showing a configuration of a light collecting lens of the present invention.
Figure 3:
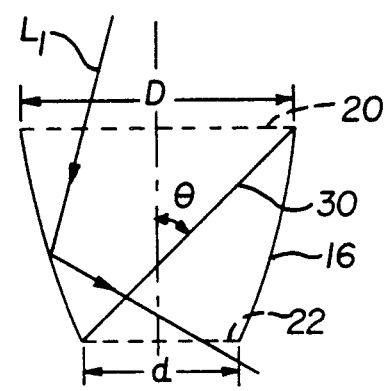
FIG. 3 is a schematic illustration showing a portion of the lens of FIG. 2.

Referring now to FIGS. 2 and 3, additional discussion of the preferred configuration of the parabolic lens 4 will be provided. This lens 4 serves to condense the image, i.e focus it into a smaller area thereby increasing the overall image brightness and intensity. The aperture is the same as in lens 2 but it has a shorter focal length. As is shown in FIG. 2 the elongated, generally pear-shaped lens has a light receiving portion shown toward the upper end of FIG. 3 and a light exiting portion shown toward the lower end of FIG. 3. The entrance surface 12 is exterior y convex and may be of spherical configuration with a radius of curvature of about 5.0 to 13.0 mm. The exit portion has an exit surface 14 which is exteriorly convex and may be generally spherical with a radius of curvature of about 3.00 to 6.5 mm. The lateral surface 16 connects surfaces 12 and 14 and is preferably of substantially parabolic configuration. A plane perpendicular to axis A cut through the lens generally where entrance surface 12 meets lateral surface 16 would establish the entrance pupil 20. This would be of substantially circular configuration. Similarly, a plane oriented generally transversely with respect to axis A passed through the lens generally where exit surface 14 meets lateral surface 16 would establish exit pupil 22 which would be generally circular in configuration.

In the embodiment shown in FIG. 2, as the upper circle has a radius $R_3$ and the lower circle has a radius $R_4$, which circles in the form shown are tangent. The axial extent of the portion intermediate entrance pupil 20 and exit pupil 22 falls within the preferred range of being about 45 to 55 percent of the overall axial extent of the lens.

In the preferred embodiment of the invention the ratio of the radius of the entry portion of the concentrating lens to the radius of the exit portion (such $R_3:R_4$ in FIG. 2) is preferably about 2 to 1.

In a preferred form of the invention the concentrating lens will be provided with a graded index of refraction. For example, in FIG. 2, the entry portion having radius $R_3$ may be provided with a higher or lower index of refraction than the exit portion having radius $R_4$. This improves the quality of the lens by reducing the spherical aberration. The index of refraction will preferably be within the range of about 1.56 to 1.4. In a preferred graded index of refraction lens, with reference to FIG. 3, the center axial core will make a cylindrical portion of a first index of refraction with several annular bands of different indices of refraction surrounding them. It is preferred that the index of refraction be progressively increased as one moves from the cylindrical portion radially outward to the outer surface 16. For example, the cylindrical portion may have an index of refraction of about 1.41–1.43 with the adjacent annular portion having an index of refraction of about 1.47–1.48 and the next annular band having an index of refraction of about 1.50–1.52. This means that light entering the lens 4 will be more weakly deflected in the regions of lower index of refraction. This graded index is preferably employed solely within the region of lens 4 disposed between pupils 20 and 22. The strong deflection of portions of light passing through the radially outer higher index of refraction regions serves to facilitate improved focusing of the image and resists spherical aberration. The entry portion of the lens 4 (surface 12) is preferably of a uniform index of refraction. The exit portion of lens 4 (surface 14) may have a graded index of refraction which, for example, could continue the zones of section 16 or could be of uniform index of refraction which may be the same as that of entry region 12.

It is preferred that the parabolic lens 4 be generally symmetrical with respect to the longitudinal center axis A. It is also preferred that the axial extent of the intermediate portion defined by lateral surface 16 be about 45 to 55 percent of the overall axial length of the lens. With reference to FIG. 3, it is seen that the entrance pupil 20 has a diameter "D" which is greater than the diameter "d" of the exit pupil 22. The ratio of "D" to "d" will be about 1.5 to 4.0 with the range preferred being 1.8 to 2.2.

The size of lens 4 may vary depending upon the particular end use environment. In a prosthesis, for example, the overall axial extent of the lens 4 may preferably be about 20 to 25 mm.

The geometry of lens 4 is preferably such that a line extending from a point on the periphery of exit pupil 22 to a diametrically opposed peripheral point on entrance pupil 20 in passing through the longitudinal axis A will form an input or acceptance angle theta which may be about 10 to 25 degrees and preferably about 15 to 24 degrees.

As is shown in FIG. 3, a light beam $L_1$ entering the lens 4 angularly will be caused to reflect before it emerges from the lens. Similarly, most angularly introduced light beams and a significant portion of axially introduced light beams will be refracted and reflected within the lens before emerging. As a result of the geometric shape of lens 4, light entering the lens is concentrated from the larger area 20 to the smaller area 22, i.e. at the exit area.

Figure 4:
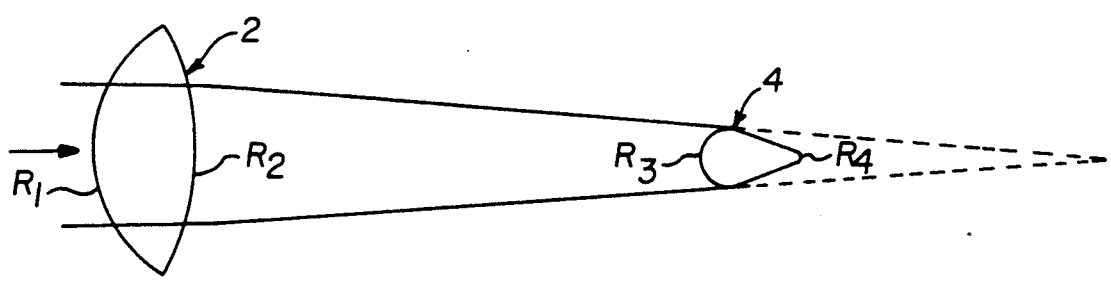
FIG. 4 is a schematic illustration of a lens system of the present invention.

With further reference to FIG. 4, the preferred geometric relationships between the opposed surfaces of lenses 2, 4 will be considered. With light impinging on the lens from the left in FIG. 4 in the direction of the arrow the front face of lens 2 will have a radius $R_1$ and the rear face will have a radius $R_2$. Radius $R_2$ will generally be about 1.0 to 4.0 times radius $R_1$ and preferably about 1.9 to 2.3 times radius $R_1$. Radius $R_3$ of the front face of lens 4 will generally be about 1.5 to 4.0 times radius $R_4$ of the rear face of lens 4 and preferably about 1.9 to 2.3 times $R_4$. These relationships in radii of curvatures contribute to the effectiveness of the system.

Lens 4 preferably has an index of refraction of about 1.4 to 1.6, although this may vary depending on whether a graded index of refraction of the lens material is employed. In one embodiment of the invention, in order to enhance light collection the entrance portion 12, 20 and an adjacent portion of the lateral section may be composed of a material having a first index of refraction and the exit portion 14, 22 and an adjacent portion of the lateral section may be composed of a material having a second index of refraction.

Referring now to FIGS. 5 through 8, a form of housing member suitable for use with the present invention will now be considered. The housing member 40 is an elongated tubular member within which are secured the imaging lens 2 and the light concentrating lens 4. The housing in the form shown has a stepped forward housing portion 43 which contains lens 2 and a stepped rearward housing portion 45. The housing portion 43 has internal threads 44 which are interengaged with external threads 46 on housing portion 45. Lens 4 is secured within housing portion 45. This threaded connection enables the user to focus the unit by effecting a change in relative spacing of the lenses 2,4. This may preferably focus from about 16 inches to infinity.

Figure 6:
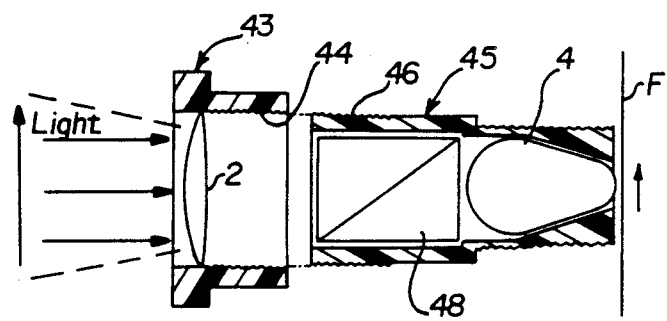
FIG. 6 is an exploded partially schematic cross-sectional illustration of the housing of FIG. 5.
Figure 7:
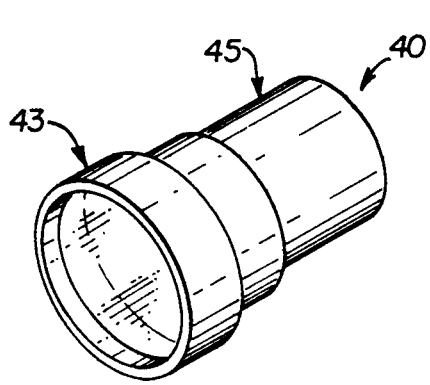
FIG. 7 is a perspective view showing a front portion of the housing of FIG. 5.
Figure 8:
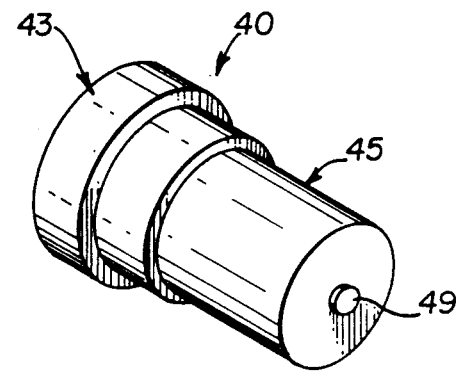
FIG. 8 is a perspective view showing a rear portion of the housing of FIG. 5.

Also shown in FIG. 6 is the presence within housing portion 45 of an image erecting prism 48. This prism 48 serves merely to rotate the unfocused image 180 degrees in order that the image produced by the light entering in the direction indicated by the arrows and passing through lens 2 will be an erect image prior to being focused on image plane F by lens 4. It is desired to place the user's eye close to plane F. Such inversion would not be needed in a camera employing the lens system of this invention.

Figure 5:
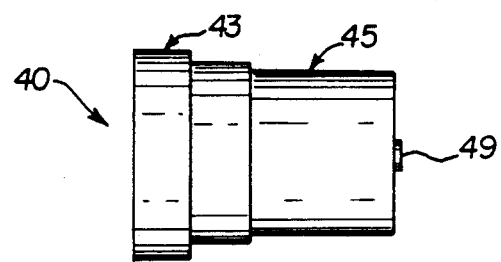
FIG. 5 is a front elevational view of a housing employable in the present invention.

As is shown in FIG. 5, a lens protecting end closure 49 may be secured to housing 40. It will be appreciated that the generally cylindrical housing member will receive light through lens 2 which light will be passed through lens 4 and emerge therefrom into the eye of the user.

EXAMPLE

Figure 1:
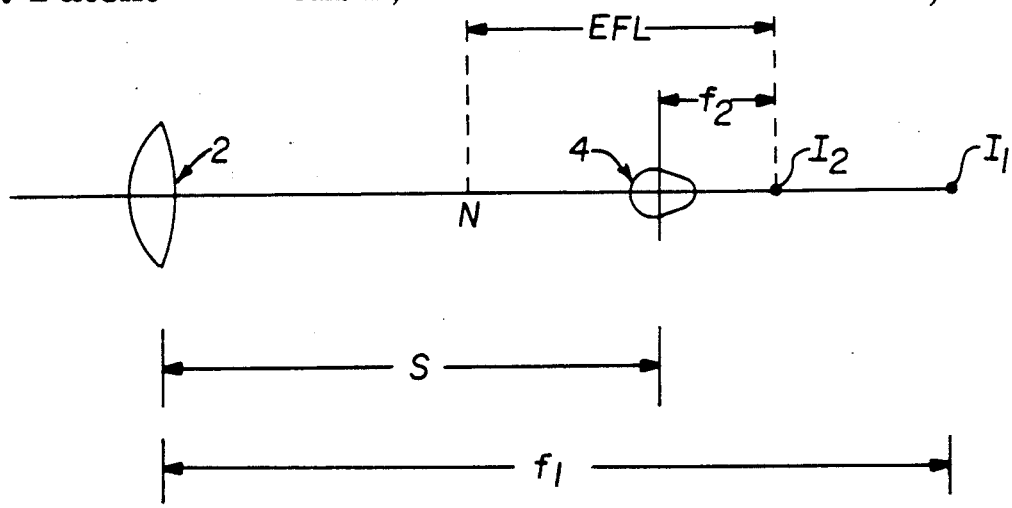
FIG. 1 is a schematic illustration showing a form of lens arrangement of the present invention.

In order to provide additional details regarding the system, an example will be considered with reference to FIGS. 1 and 2. Lens 2 has a diameter of 25.4 mm and a thickness of 4.2 mm. Lens 2 has an entry radius $R_1$ of 42.4 mm and an exit radius $R_2$ of 84.15 mm. The prism 48 (FIG. 6) has a light path length of 19.05 mm. Lens 4 has a total axial length of 24.95 mm. The entry radius $R_3$ of lens 4 has a diameter of 7.95 mm and the exit radius $R_4$ has a radius of 4.00 mm. The entrance pupil 20 (FIG. 3) has a diameter of 7.48 mm and an exit pupil of 3.77 mm. These dimensions produce a focal length for lens 2 of 1.6 and a field of vision of about 3 degrees across. This arrangement provides an optical system which facilitates rapid scanning and provides a high aperture which results in a high resolution image.

As an example of the housing sizes which might be appropriate for human use the large diameter portion of the housing member 40 may have a length of about 5.7 centimeters, and the enlarged diameter portion may have a diameter of about 3.5 centimeters.

Figure 9:
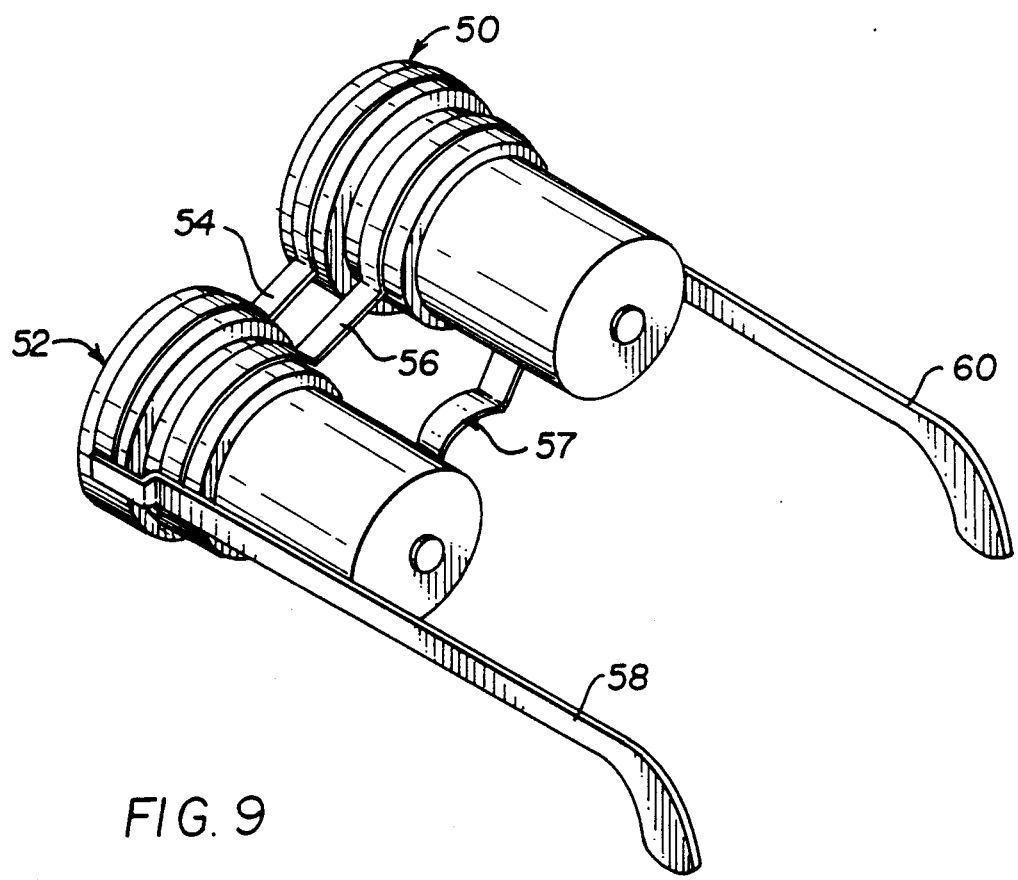
FIG. 9 is a perspective view of a form of a prosthesis of the present invention.

Referring to FIG. 9, there is shown a prosthesis of the present invention adapted to be worn by a visually impaired human much in the manner that eyeglasses are worn. The housing members 50, 52 are secured in relatively fixed position by support members 54, 56 which are preferably substantially rigid and have a pair of end portions which circumferentially secure the housing members 50, 52 in position. In addition, a nose support 57 is secured between the housing members 50, 52 and has an underlying central recess which is adapted to engage the bridge of the nose. Ear supports 58, 60 are secured to support 54 and are adapted to be positioned in overlying supported relationship with respect to the individual's ears. It should be noted that a further advantage of this invention is that no additional light source is needed in order for the optical device to function effectively. Also, the optical device while conveniently provided in the form of eyeglasses could be provided as a hand-held device.

Figure 10:
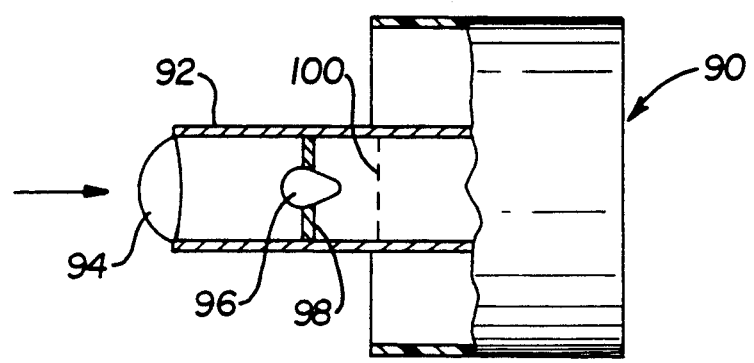
FIG. 10 is a partially broken away end elevational view of the lens system as employed in a camera.

Referring to FIG. 10, there is shown a lens system of the present invention as used in a camera. This lens system permits improved photography under low light conditions as the limited light is concentrated to permit increased film exposure. In the form illustrated, camera body 90 has a lens housing 92 secured to and operatively associated therewith. The imaging lens 94 is disposed closer to the free end of housing 92 than is concentrating lens 96 which is secured generally centrally within housing 92 by support 98. Support 98 is preferably an apertured, opaque circular disk which resists passage of light therethrough except through lens 96 which is secured within the aperture. Light will enter the camera from the direction indicated by the arrow and impinging upon film 100. Lenses 94, 96 may have the same shape, properties and spacing as those described in connection with FIGS. 1 through 8. An image inverting prism is not needed.

In a preferred form of the invention the concentrating lens will be provided with a graded index of refraction. For example, in FIG. 10, the entry portion having radius $r_1$ may be provided with a higher or lower index of refraction than the exit portion having radius $r_2$. This improves the quality of the lens by reducing the spherical aberration. The index of refraction will preferably be within the range of about 1.56 to 1.4.

While for convenience of reference herein the visual aid shown in FIG. 9 has been described in terms of its use as a prosthesis for the partially sighted, it may also be employed to assist a surgeon in microsurgery and such use is expressly contemplated.

It will be appreciated that the prosthesis of the present invention provides as a result of the combination of the imaging lens and the unique light concentrating lens and relative positioning thereof an effective means for a visually handicapped person to improve vision in low light or diffuse light situations (such as in watching television) while providing high resolution. All of this is accomplished in an efficient and economical manner which makes the system economical to provide and easy to use. Similarly, advantageous use in the medical environment as in microsurgery and for examining orifices not easily viewed by existing means, cameras and optical scanners associated with computers is provided for. Additional advantageous uses of the lens system will be apparent to those skilled in the art.

Whereas particular embodiments of the invention have been described above for purposes of illustration, it will be appreciated by those skilled in the art that numerous variations of the details may be made without departing from the invention as described in the appended claims.

I claim:

1. A lens system comprising:
   at least one elongated tubular housing member,
   each said housing member having secured therewithin an imaging lens and an elongated generally pear-shaped concentrating lens,
   said concentrating lens having an exteriorly generally convex entrance surface and an exteriorly generally convex exit surface,
   said entrance surface being generally spherical and said exit surface being generally spherical,
   said imaging lens being spaced from said concentrating lens by a predetermined distance,
   said concentrating lens disposed within the focal length of said imaging lens,
   said entry end surface facing said imaging lens,
   said entry end surface having a radius of curvature which is about 1.5 to 4.0 times the exit end surface radius of curvature,
   said entry end surface having a radius curvature of about 1.9 to 2.3 times the exit end radius of curvature,
   the exterior surface of said concentrating lens between said entry end surfaces and said exit end surfaces being substantially parabolic,
   said concentrating lens being substantially symmetrical about its longitudinal axes,
   an entrance pupil disposed generally transversely with respect to said concentrating lens longitudinal axis generally where said entry surface meets said substantial parabolic surface,
   an exit pupil disposed generally transversely with respect to said concentrating lens longitudinal axis generally where said exit surface meets said substantially parabolic surface,
   said entrance pupil being substantially circular,
   said exit pupil being substantially circular, and
   a line connecting diametrically opposed portions of said exit pupil and said entrance pupil in passing through said amplifying lens longitudinal axis will form an angle with said axis of about 10 to 25 degrees.

2. The lens system of claim 1 including said line forming an angle of about 15 to 24 degrees.

* * * * *